(12) United States Patent
Stanley et al.

(10) Patent No.: US 8,847,171 B2
(45) Date of Patent: Sep. 30, 2014

(54) RADIATION DETECTOR

(75) Inventors: Steven John Stanley, Lancashire (GB); John Horsfall, Warrington Cheshire (GB)

(73) Assignee: National Nuclear Laboratory Limited (GB)

( * ) Notice: Subject to any disclaimer, the term of this patent is extended or adjusted under 35 U.S.C. 154(b) by 0 days.

(21) Appl. No.: 13/988,885

(22) PCT Filed: Nov. 28, 2011

(86) PCT No.: PCT/GB2011/052346
§ 371 (c)(1),
(2), (4) Date: May 22, 2013

(87) PCT Pub. No.: WO2012/069857
PCT Pub. Date: May 31, 2012

(65) Prior Publication Data
US 2013/0234033 A1 Sep. 12, 2013

(30) Foreign Application Priority Data
Nov. 26, 2010 (GB) .................................. 1020059.0

(51) Int. Cl.
| | | |
|---|---|---|
| *G01T 1/29* | (2006.01) | |
| *G01T 5/10* | (2006.01) | |
| *G01T 7/00* | (2006.01) | |
| *G01T 1/08* | (2006.01) | |
| *G01T 1/203* | (2006.01) | |

(52) U.S. Cl.
CPC ................. *G01T 1/2914* (2013.01); *G01T 5/10* (2013.01); *G01T 7/00* (2013.01); *G01T 1/08* (2013.01); *G01T 1/203* (2013.01)
USPC ..................................................... 250/395

(58) Field of Classification Search
CPC ............... G01T 1/08; G01T 1/16; G01T 7/00; G01T 1/2002; G01T 1/203; G01T 1/2914
USPC ........................................................ 250/395
See application file for complete search history.

(56) References Cited

U.S. PATENT DOCUMENTS

| | | | |
|---|---|---|---|
| 4,350,607 A | 9/1982 | Apfel | |
| 4,430,258 A | 2/1984 | McFarland et al. | |
| 4,588,698 A | 5/1986 | Gruner et al. | |
| 4,779,000 A | 10/1988 | Ing | |
| 5,321,357 A | 6/1994 | Maryanski et al. | |
| 5,359,200 A * | 10/1994 | Donahue et al. | ............ 250/475.2 |
| 6,218,673 B1 | 4/2001 | Gore et al. | |
| 7,258,923 B2 * | 8/2007 | van den Bogerd et al. | ... 428/412 |
| 2001/0052572 A1 * | 12/2001 | Mikami et al. | ................ 250/394 |
| 2007/0019790 A1 | 1/2007 | Lewis et al. | |
| 2007/0114445 A1 * | 5/2007 | Schell et al. | ............... 250/474.1 |
| 2012/0112099 A1 | 5/2012 | Coleman et al. | |

FOREIGN PATENT DOCUMENTS

| | | |
|---|---|---|
| GB | 2454691 | 5/2009 |
| WO | WO2004/079393 | 9/2004 |
| WO | WO 2004079393 | 9/2004 |
| WO | WO2007/018749 | 2/2007 |
| WO | WO2009/063246 | 5/2009 |

OTHER PUBLICATIONS

Doran, S.J. et al. "Optical CT scanning of PRESAGE™ polyurethane samples with a CCD-based readout system", Journal of Physics Conference Series, Institute of Physics Publishing, Bristol, GB, vol. 3, No. 3, Jan. 1, 2004, pp. 240-243.

Day, MJ; 1990, Radiation Dosimetry Using Nuclear Magnetic Resonance: an Introductory Review, *Phys. Med. Biol.*, vol. 35, No. 12, pp. 1605-1609.

Gore, et al,; 1984, Measurement of radiation dose distributions by nuclear magnetic resonance (NMR) imaging, *Phys. Med. Biol.*, vol. 29, No. 10, pp. 1189-1197.

Schulz, et al., 1990, Dose-response curves for Fricke-infused agarose gels as obtained by nuclear magnetic resonance, *Phys. Med. Biol.*, vol. 35, No. 12, pp. 1611-1622.

* cited by examiner

*Primary Examiner* — Marcus Taningco
(74) *Attorney, Agent, or Firm* — Marianne Fuierer; Moore & Van Allen, PLLC

(57) ABSTRACT

The invention provides a device for the detection and mapping of radiation, the device comprising a polymeric core (18) located within an external shell material (1), wherein the polymeric core comprises a plurality of stacked polymeric sheets comprising at least one radiation sensitive component which is sensitive to said radiation emitted by said radioactive materials and the external sheath comprises a collimation sheath (1). Preferably, the polymeric core comprises a cubic, cylindrical, spherical or truncated spherical shape which is encased within the external shell. The external shell is preferably comprised of a metal, most preferably tungsten. The invention also provides a method for the detection and mapping of radiation in a location, which comprises: (a) placing a device according to the invention in the location to be investigated; (b) allowing the device to remain in the location and be exposed to the radiation for a predetermined length of time; (c) removing the device from the location; (d) removing the polymeric core from the external shell; (e) analyzing said polymeric core by means of an optical analysis technique applying a software-based image reconstruction algorithm to image the polymeric core; and (f) determining the location, form and intensity of said radiation by further software-based analysis. The device and method of the invention facilitate the detection and mapping of radiation, and find particular use in mapping the location, intensity and identity of radiological hazards in 3 dimensions in sites such as active cells, gloveboxes, other active plants and confined spaces. Advantages over the prior art include significantly improved radiation sensitivity, the lack of requirement for an electrical supply, and the ability to deal with high radiation backgrounds and to be deployed in confined or restricted spaces.

19 Claims, 4 Drawing Sheets

RADIATION DETECTOR

CROSS-REFERENCE TO RELATED APPLICATIONS

This application is filed under the provisions of 35 U.S.C. §371 and claims the priority of International Patent Application No. PCT/GB2011/052346 filed on Nov. 28, 2011 which in turn claims priority of Great Britain Application No. 1020059.0 filed on Nov. 26, 2010, the contents of which are incorporated by reference herein for all purposes.

FIELD OF THE INVENTION

The present invention is concerned with the detection and mapping of radiological hazards. More specifically, it relates to a novel device that facilitates mapping of the location, intensity and identity of radiological hazards.

BACKGROUND TO THE INVENTION

Numerous applications exist for techniques which are capable of detecting and accurately measuring the presence of radiation and, more specifically, which have the facility for measuring and mapping radiation dose distributions in three dimensions with high spatial resolution. Such techniques find application in, for example, the assessment of radiation therapy techniques in the medical field, and in the detection and characterisation of potential radiation hazards in the nuclear and related industries.

In the context of radiation therapy, the use of aqueous gels containing Fricke dosimeter solution in combination with magnetic resonance imaging techniques has been suggested by Gore, J. C., et al., Phys. Med. Biol. 29:1189-1197; 1984, and further investigated by, inter alia, Schulz, R. J., et al., Phys. Med. Biol. 35:1611-1622; 1990, and Day, J. J. Phys. Med. 35:1605-1609; 1990, and the ability of this technique to map the dose distributions of the complex irradiations used in stereotactic radiosurgery have subsequently been demonstrated. However, such techniques suffer from a major disadvantage that is intrinsic to the Fricke gel medium, wherein ferric ions are able to diffuse quite freely through the gel after irradiation, thereby leading to a gradual blurring of the radiation dose pattern and a consequent loss of spatial resolution.

Several other dosimetry systems which employ gels or polymerisable resins are known from the prior art. Thus, U.S. Pat. No. 4,430,258 discloses a method of producing liquid equivalent solid gamma ray calibration standards which involves adding a first organic solvent to a calibrated aqueous solution of radioactive material to form a first solution; mixing the first solution with a polymerisable resin dissolved in a second organic solvent together with a hardening catalyst to form a second solution; and curing the second solution, whilst U.S. Pat. No. 4,588,698 discloses microencapsulation of solid phase scintillators in gels selectively permeable to diffusible radioactive label, these encapsulated scintillators being used to monitor the concentration of radioactive-tagged substances in fluid systems.

U.S. Pat. No. 4,350,607 discloses a radiation detector and dosimeter based on a finely-dispersed liquid suspended in a host liquid of high viscosity or gel. When radiation, and particularly neutron radiation of sufficient energy and intensity, comes into contact with such droplets, this can trigger volatilisation of the droplets, such that the volume of vapour evolved then serves as a measure of radiation intensity and dosage.

U.S. Pat. No. 4,779,000 discloses a direct reading, self-powered detector and dosimeter for gamma rays, and other low LET radiation, and optionally microwaves wherein a transparent elastic solid medium contains uniformly dispersed droplets of a very high vapour pressure detector liquid substantially immiscible with the elastic solid, the vaporisation of said droplets being sensitive to lightly ionizing radiation such as gamma rays and microwave radiation. Thus, the solid medium retains a record of each droplet vaporised, the number being proportional to the radiation dose.

U.S. Pat. No. 5,321,357 teaches a detection system wherein a visible and/or MRI visualisable permanent image is formed in a gel in a container which maintains the gel a dimensionally stable shape. A radiation polymerisable monomer is uniformly dispersed in the gel in storage stable form in a concentration effective to form an insoluble polymer in the gel which alters the relaxation time of the solvent phase of the gel in any area in which the polymer is formed. Polymerisation of the monomer is initiated in exposed areas by incident radiant energy, the resulting image being representative of the dose distribution of the radiant energy to which the gel is exposed. In a preferred embodiment, the gel contains a mixture of a linearly homopolymerisable monomer, e.g. a vinyl monomer, and a comonomer which is crosslinkably copolymerisable with the monomer, e.g. a monomer with two vinyl groups.

Optical scanning tomography is the subject of U.S. Pat. No. 6,218,673, wherein there is disclosed an optical scanner which provides three dimensional dosimetric data by scanning, with at least one light beam, a translucent medium exhibiting optical properties which change upon receipt of radiant energy representing a dose distribution of the energy. At least one detector is employed to gather data indicative of changes in the optical properties of the medium after scanning from multiple directions, thereby providing a representation of the optical properties in sections through the medium. Typical optical properties measured include optical density, light scattering, emitted light intensities, and combinations thereof, and the patent also describes methods of reconstructing a three-dimensional energy field as a series of two-dimensional images by applying an energy field to a translucent medium having distinct optical properties that change upon receipt of the energy field, optically scanning the translucent medium at various angles, detecting and measuring data indicative of optical changes in the medium, and preparing a two-dimensional image of the energy field by analyzing the changes in the optical properties.

WO-A-2004/079393 is concerned with a three-dimensional dosimeter for penetrating radiation, and describes a method of forming a three-dimensional dosimetric map in a solid translucent or transparent polymer and an article of manufacture comprising a polymer formulated to capture data imparted by incident penetrating radiation. The detects and displays a dose or doses of penetrating radiation by forming within the polymeric matrix a 3D dosimetric map which is measurable and quantifiable by known procedures. The dosimetric map is representative of the 3D distribution of the dose or doses of the penetrating radiation to which the polymer had been exposed and can be quantified at high spatial resolution, thereby providing an accurate, stable, storable record in three dimensions of the radiation exposure or dosing event(s).

In WO-A-2009/063246, the present inventors disclosed device for the detection and mapping of radiation emitted by radioactive materials, said device comprising a polymeric core located within an external shell material, wherein said polymeric core comprises at least one radiation sensitive component which is sensitive to said radiation emitted by said radioactive materials and said external shell comprises a collimation sheath. The polymeric core preferably comprises a single polymeric piece, moulded in the desired shape, preferably a truncated sphere and is most preferably formed from a polyurethane, such as PRESAGE™.

WO-A-2007/018749 discloses GAFCHROMIC®, which is a radiochromic based self developing radiation film that comprises (a) a support layer; (b) a radiation sensitive composition, such as a crystalline image receptive polyacetylenic compound, on said support. Such radiochromic based self developing radiation films, such as GAFCHROMIC®, are analysed using an optical flat bed scanner, more specifically a RGB colour scanner. This allows for the formation of a digital image following the exposure and optical flat bed scanning of the irradiated film. This material offers a significant enhancement of sensitivity to radiation when compared with radiation sensitive dosimeters comprising moulded materials such as such as PRESAGE™.

Devices for the detection and measurement of radiation in industrial plants, such as the Radscan® 800 (available from BIL Solutions Ltd.), may be obtained commercially, and offer a convenient means for providing colour contour maps showing the spread and intensity of radiation over an area. Such devices are particularly useful when large areas require surveying, or in instances where access may be limited due to physical constraints or safety considerations, and they find particular application in, for example, the investigation of spillages of radioactive material, or the identification of γ-hotspots during nuclear decommissioning operations. The Radscan® 800 comprises an optical arrangement which includes a CCD camera and laser range finder which operate in conjunction with caesium iodide detector attached to a photodiode and amplifier, these components being housed within a tungsten collimator.

Many of the techniques of the prior art do, however, suffer from several disadvantages. For example, many systems—and particularly those associated with radiation therapy applications—demonstrate an inability to perform in high radiation backgrounds. Other common difficulties include practical problems in deployment, due to physical spatial constraints or the remoteness of locations in which investigations are to be performed. Furthermore, cost issues are often highly significant, with systems such as the Radscan® 800 typically being expensive to purchase.

Thus, the present inventors have sought to address these issues and to provide a system and method for the detection and mapping of radiation which overcomes the difficulties associated with the prior art whilst also offering significantly enhanced radiation sensitivity when compared to prior art devices. The present invention, therefore, provides a means for the detection and mapping of radiation which performs effectively and efficiently in high radiation backgrounds, requires no electrical supply in order to function—and may, therefore, be deployed in a wide variety of locations and circumstances—and is relatively cheap and easy to manufacture.

SUMMARY OF THE INVENTION

Thus, according to a first aspect of the present invention, there is provided a device for the detection and mapping of radiation emitted by radioactive materials, said device comprising a polymeric core located within an external shell material, wherein said polymeric core comprises a plurality of stacked polymeric sheets comprising at least one radiation sensitive component which is sensitive to said radiation emitted by said radioactive materials and said external shell comprises a collimation sheath.

The radiation emitted by said radioactive materials predominantly comprises gamma-radiation and, therefore, it is essential that said radiation sensitive core component is sensitive to gamma-radiation. However, said emitted radiation may also contain amounts of beta-radiation, in addition to neutron radiation, so it is desirable that said core material is also sensitive to beta-radiation and neutron radiation.

Said polymeric core comprising a plurality of stacked polymeric sheets may be formed in a variety of shapes. Preferably, however, said polymeric core comprises a cubic, cylindrical or spherical shape but, most preferably, said core comprises a truncated spherical (dome-shaped) core. Optionally said plurality of stacked polymeric sheets comprises at least one inert intermediate layer. Typically, said plurality of stacked polymeric sheets comprises from 2 to 500 stacked sheets, preferably in combination with a plurality of inert intermediate layers spaced therebetween. In certain embodiments of the invention, said plurality of stacked polymeric sheets comprises an equal number of alternate polymeric sheets and inert layers but, in preferred embodiments of the invention, said plurality of stacked polymeric sheets comprises one more inert layer than the number of polymeric sheets, so that the top and bottom layer in said stacks comprises an inert layer. Particularly suitable numbers of polymeric sheets and inert layers may, for example, vary between 10 and 100 of each component, more particularly between 20 and 50 of each component, most particularly between 30 and 40 of each component with the number of inert layers typically being one more than the number of polymeric sheets in each case. Especially successful results have been achieved using a polymeric core composed of 38 polymeric sheets and 39 inert layers.

Stacking of sheets and intermediate layers may be achieved by means of either vertical or horizontal stacking, or by a combination of vertical and horizontal stacking. Particular success has been achieved with embodiments of the invention which rely on horizontal stacking of components.

Said core is encased within said external shell which, in each case, is shaped in a complementary way to the core. Said external shell is preferably comprised of a metal. Most preferably, said metal comprises lead or, more particularly, tungsten. Specifically, the invention envisages the use of a collimation sheath as an external shell in a device according to the first aspect of the invention. Such collimation sheaths are removable from the polymeric core material following radiation exposure, and may then be re-used in further devices according to the invention.

Accordingly, said collimation sheath is adapted to fit around said core material, and to be removable therefrom. Said collimation sheath has a shape which is complementary to the polymeric core material around which it is designed to fit and, therefore, it preferably has a cubic, cylindrical or dome-shaped truncated spherical shape but, most preferably, a spherical shape. In order to allow said sheath to fit around said core material it comprises two sections which, optionally, may be interconnected. Typically, therefore, in the case of a spherical collimation device, there are provided two hemispherical sections.

Said collimation sheath may comprise a hinged arrangement, whereby said two sections are interconnected by said arrangement and said shell closes around said core material. Preferably, however, said sheath comprises two separate sections which essentially form upper and lower sections. Typically, said sections may be interconnected by at least one fastening means, wherein said fastening means may conveniently be attached to the outer surface of said sheath so as to maintain said sections in a fixed arrangement. In a particular embodiment, therefore, said fastening means may comprise a solid member including attachment means adapted to securely separately attach distal ends of said member to each of said sections of said sheath. Suitable attachment means may, for example, include metallic screws, nails or rivets, and a suitable solid member may comprise a metallic plate.

In a typical arrangement according to the invention, the core material is placed in the lower section, and the arrangement is then completed by placing the upper section thereon, the upper section being adapted so as to closely cooperate with the lower section and close around the core material. The upper and lower sections are then typically held together, as described above, by the use of fastening means including attachment means. An alternative arrangement may envisage that the upper section may be held in position by placing securing means around the exterior of said collimation sheath, suitable securing means comprising, for example, an arrangement of straps, or a continuous covering comprising a flexible sheet or film.

In certain embodiments of the invention, the core material is held in place within the external shell by means of a holding device, adapted to securely immobilise said core material within said shell. In a typical arrangement, said holding device comprises a base section on which the components of said core material may be placed and, attached to said base section, locating means which determine the position of the core material. Said locating means may suitably comprise a central section and an outer section which together define the space within which the core material is to be located. In particular embodiments, said central section may comprise a shaft fixedly attached to said base section and said outer section may comprise at least one arcuate outer member attached at one end to said base section and, at the other end, to the end of said central section which is distant from said base section. Said at least one arcuate outer member most conveniently comprises a single curved arm attached at one end to the base section and, at the other end to the central section which typically comprises a central shaft.

The components of the core material are typically adapted so as to cooperate with the locating means of the holding device, and are shaped as appropriate to ensure optimum positioning and secure location on the holding device.

In certain embodiments of the invention, the holding device is located on a platform inside said external shell which, typically, is fixedly attached within said shell. The base section of the holding device is most conveniently adapted to be securely placed on said platform and preferably held in position by suitable engaging means.

In embodiments of the invention, in addition to said engaging means, the holding device may optionally be further secured to said platform by the use of supplementary attachment means which, typically, may comprise flexible attachment means, such as at least one flexible strap, attached to said platform and extending over the extremities of the holding device.

In embodiments of the invention wherein said external shell comprises a spherical shell, said platform is fixedly attached to the inner surface of said shell and said platform and the base section of said holding device are both circular in cross section. In these embodiments, therefore, it can be seen that said core material is most conveniently shaped in the form of a truncated sphere, wherein the truncated end of said core material may be placed on the base section of said holding device.

The material from which said collimation sheath is formed is essentially opaque to the radiation emitted by radioactive materials, but said sheath comprises a plurality of holes through its surface, said holes allowing said radiation which is incident on said sheath to pass through said sheath such that the tracks of said radiation may be captured by the polymeric core material. Said plurality of holes in said sheath preferably comprises a plurality of pinholes.

According to a second aspect of the present invention, there is provided a method for the detection and mapping of radiation in a location, wherein said method comprises:
 (a) placing a device according to the first aspect of the invention in the location to be investigated;
 (b) allowing said device to remain in said location and be exposed to said radiation for a predetermined length of time;
 (c) removing said device from said location;
 (d) removing the polymeric core from the external shell;
 (e) analysing said polymeric core by means of an optical analysis technique applying a software-based image reconstruction algorithm to image the polymeric core; and
 (f) determining the location, form and intensity of said radiation by further software-based analysis.

Preferably, said analysis of said stacked polymeric sheets is carried out by means of flat bed optical scanning in order to digitise the opacity distribution in each sheet, with the subsequent further software-based analysis providing an image defining the location and nature of the radiation present by utilising a knowledge of the positional placement of the design and the assigned cell/confined space geometry.

BRIEF DESCRIPTION OF THE DRAWINGS

Embodiments of the invention are further described hereinafter with reference to the accompanying drawings, in which.

DESCRIPTION OF THE INVENTION

The device of the present invention is based on a polymeric core material comprising at least one radiation sensitive material which is located within an external shall material comprising a collimation sheath. The polymeric core comprises a plurality of stacked polymeric sheets comprising at least one radiation sensitive component and optionally said plurality of stacked sheets comprises at least one inert intermediate layer, preferably a plurality of inert intermediate layers. The device and method of the invention facilitate the detection and mapping of radiation, and find particular use in mapping the location, intensity and identity of radiological hazards in 3 dimensions in sites such as active cells, gloveboxes, other active plants and confined spaces.

The device typically has a spherical shape and a diameter in the region of 5-20 cm, most conveniently around 10-15 cm, for example about 13 cm. A basic spherical shape has been shown to provide the most satisfactory and efficient embodiment of the invention, and the device may, for example, be placed on a platform on a flat surface. Alternatively, the device may be suspended in space by hanging from a suitable surface. For any given device according to the invention, as previously discussed, the shape of the core material will naturally be designed to effectively conform to that of the shell.

The inventors have found that the spherical shape of device offers the most efficient means for achieving optimum coverage for the monitoring of incident radiation, with the inner core being formed in the shape of a truncated sphere. The size of the core is chosen with a view to issues such as practicalities with deployment, the depth of material required to successfully capture different energies of incident radiation, and the spatial resolution of the optical tomography system which is used to digitise the data from the polymeric core after irradiated and removal from the area under examination.

The shell is designed with a view to certain very specific requirements. Thus, for example, the thickness of the sheath should be sufficiently small as to not geometrically restrict the incident radiation through the collimation holes. However, it is also required to be sufficiently thick to stop radiation in regions of the core not adjacent the collimation holes in order to achieve the required degree of contrast.

The core material comprises a polymeric material which is sensitive to radiation emitted by a radioactive material and is provided in the form of a plurality of stacked polymeric sheets comprising at least one radiation sensitive component. Optionally, said plurality of stacked polymeric sheets comprises at least one inert intermediate layer, preferably a plurality of inert intermediate layers. Principally, said radiation comprises gamma-radiation, such as that emitted by, for example, cobalt 60 ($^{60}$Co) or caesium 137 ($^{137}$Cs). Said radiation may also comprise beta-radiation and neutron radiation. It is a key requirement of the invention that the sheets within the polymeric core should be sensitive to such radiation. However, said polymeric core may also be sensitive to visible light and other energies of electromagnetic radiation although, at background levels, the level of responsiveness of said polymeric core is not very high. Thus, whilst it is advisable that said polymeric core material should be stored away from bright light, in operation the radiation levels generated as a result of the presence of gamma emitting radiation within a space to be surveyed by the device would always be much higher than the standard background radiation levels. Prior to use, the polymeric core material is typically stored in a material which is opaque to light, such as a black wrapping film.

Said polymeric core comprises a plurality of stacked polymeric sheets, optionally additionally comprising a plurality of intermediate inert layers which fit inside the said collimation device and form a 3D shape that fits within the collimation sheath. The said stacked polymeric sheets having the required radiation sensitivity form transparent moulded pieces prior to use, which become opaque following exposure to radiation. Specific materials for the stacked polymeric sheets which may be used in the context of the present invention include radiochromic based self developing radiation films that comprise polyester layers and layers of radiation sensitive materials, typically in the form of a crystalline image receptive polyacetylenic compound. Such materials are commercially available as GAFCHROMIC® films, e.g. GAFCHROMIC® EBT type films.

The sheets of radiation sensitive material in said GAFCHROMIC® films comprise a layer of radiation sensitive material which is about 30 μm thick which is applied to a clear polyester substrate about 175 μm thick. A thin topcoat then overlays the radiation sensitive layer and the coated layers are over-laminated with a polyester layer about 50 μm thick, and a pressure-sensitive adhesive.

Said inert intermediate layers comprise non-radiation sensitive machinable materials, which may be selected from a variety of non-radiation sensitive plastic materials or other inert materials such as stainless steel, lead, tungsten or, most particularly, aluminium. The thickness of the said layers may be anywhere in the range of from 1 mm to 1 cm. Typical thicknesses vary between 1 and 3 mm and, in certain embodiments of the invention, inert layers of different thickness may be present in the same device in thicknesses of, typically, 1 mm, 2 mm and 3 mm.

Preferably, said polymeric core material comprises a colour change material, which changes colour following exposure to radiation and provides a coloured image after radiation exposure, to allow analysis of the exposed material to be more readily performed.

Said shell, or collimation sheath, comprises a metallic casing, adapted to surround the polymeric core material and having a shape which is complementary to the shape of that material. A preferred shape of the shell is spherical. The shell may comprise a hinged arrangement of upper and lower sections, but more preferably comprises two separate, detachable sections which fit together to form the shell, preferably in the shape of a sphere. Preferably, the two sections are of comparable size, and are interconnected by at least one fastening means, wherein said fastening means is attached to the outer surface of said sheath so as to maintain said sections in a fixed arrangement. In certain embodiments, the fastening means comprises a solid member including attachment means adapted to securely separately attach distal ends of said member to each of said sections of said sheath and thereby to secure the two sections as a single shell around the core material. Suitable attachment means may include metallic screws, nails or rivets, and a suitable solid member may comprise a metallic plate. The components of said fastening means maybe suitably comprised of, for example, brass.

Thus, in the most preferred embodiment, the collimation sheath preferably comprises a lower section and an upper section; the polymeric core is placed in the lower section, and the upper section of the sheath then fits over the core and onto the lower section, with the joint between the upper and lower sections being stepped to enable a good fit.

In other embodiments of the invention, the upper section of the sheath may rotate independently from the lower section and, when the device is in operation, the lid is preferably held in position by suitable securing means located around the exterior of said collimation sheath, said securing means comprising, for example, an arrangement of straps or a continuous covering which may be formed of a suitable plastics material, most preferably a low density plastics material, or a flexible plastic sheet or film. Alternatively, temporary means of adhesion, such as adhesive tape, may be envisaged to secure the upper and lower sections together.

In some embodiments, no separate means is employed to secure the core into the sheath, and the sheath is designed to fit tightly around the core, thereby restricting rotational movement. Alternatively, the collimation sheath may be designed such that the polymeric core may only be placed within said sheath in one specific configuration, such that it is thereby held in place in the said configuration. Said arrangement may, for example, require the core to be located on one or more small protrusions such as spikes, preferably two spikes, located on the inside of the lower section of the sheath.

However, the most preferred embodiments of the invention envisage that the core material is held in place within the external shell by means of a holding device, adapted to securely immobilise said core material within said shell. Typically, said holding device comprises a base section on which the components of said core material may be placed and, attached to said base section, locating means which determine the position of the core material. Said locating means may suitably comprise a central section and an outer section which together define the space within which the core material is to be located. In particular embodiments, said central section may comprise a shaft fixedly attached to said base section and said outer section may comprise at least one arcuate outer member attached at one end to said base section and, at the other end, to the end of said central section which is distant from said base section. Said at least one arcuate outer member most conveniently comprises a single curved arm attached at one end to the base section and, at the other end, to the central section which typically comprises a central shaft.

The components of the core material are adapted so as to cooperate with the locating means of the holding device, and are shaped appropriately within that context in order to ensure optimum positioning and secure location on the holding device. Thus, for example, in the context of a spherical collimation sheath including a holding device, said core material may typically comprise essentially circular polymeric sheets and inert intermediate layers of differing diameter, adapted to fit within the spherical shell, and additionally comprising incisions so as to allow the layers to be fitted around the central section of the holding device.

In certain embodiments of the invention, the holding device is located on a platform inside said external shell which, typically, is fixedly attached within said shell. The base section of the holding device is most conveniently adapted to be securely placed on said platform and preferably held in position by suitable engaging means such as, for example, a single protrusion designed to co-operate with a suitable recess located on the underside of the base section of said holding device in order to prevent rotational, or any other movement of the holding device, and thereby the core material, within the external shell.

In embodiments of the invention, in addition to said engaging means, the holding device—and thereby the polymeric core—may optionally be further secured to said platform by the use of supplementary attachment means which, typically, may comprise flexible attachment means, such as at least one flexible strap, attached to said platform and extending over the extremities of the holding device. Typically, said flexible attachment means comprises a plurality of straps, ideally two straps. Most conveniently, said straps may be held in place by fixing to said platform by means of protruding members, for example located at the side of said platform, around which the straps may be wound before extending over the body of the holding device. Desirably, said flexible attachment means may be formed from at least one material which provides suitable degrees of strength and elasticity including, for example, materials comprising at least one of rubber and/or nylon.

Typically, the platform is fixedly attached to the inner surface of the lower section of said shell, most conveniently by affixing means comprising, for example, a simple screw-threaded arrangement with male and female members attached, in either possible configuration, to each of the inner surface of the lower section of the shell and the underside of the platform.

In embodiments of the invention wherein said external shell comprises a spherical shell, said platform is fixedly attached to the inner surface of said shell as described above, and said platform and the base section of said holding device are both circular in cross section. In these embodiments, it can be seen, therefore, that said core material is most conveniently shaped in the form of a truncated sphere, wherein the truncated end of said core material may be placed on the base section of said holding device.

The shell is comprised of a suitably dense metal which is essentially impermeable to the radiation which is emitted by the radioactive source. In addition, said shell comprises a metal which is machinable and/or castable into a collimation sheath. The choice of metal is generally dependent on the nature of the incident radiation to which the device is to be exposed, but suitable materials include iron, steel, gallium, lead and other metallic alloys. Most preferably, however, said metal comprises tungsten.

The thickness of said shell material is typically from 1 to 20 mm, preferably from 5 to 15 mm, but is most preferably in the region of 10 mm. Transmission of the radiation through the shell to the core material is achieved by providing said shell with a plurality of holes, which penetrate through the shell and allow the radiation to pass through to the core. In this way, the shell functions as a collimation sheath, and serves to orientate and focus the radiation onto the core material in a similar manner as, for example, a collimator in an optical spectrophotometer.

The holes in the collimation sheath are pinholes which cause the incident radiation tracks to be captured inside the polymeric core. The holes restrict the paths of the incident radiation into the polymeric core in regions not adjacent the holes. Thus, radiation delivered through the holes produces radiation tracks or shine paths in the core, thereby providing information concerning the directionality of the radiation. In addition, the depth of the tracks provides information relating to the source of the radiation energy which may facilitate the identification of different isotopes. Such information may also be gleaned from differences in the opacity in regions adjacent and not adjacent the collimation holes, which can allow for estimate of the ease of attenuation of the radiation, thereby offering an alternative means for identification of different isotopes.

The cross-sectional area of the holes in the sheath is generally in the region of between 0.5 $mm^2$ and 25 $mm^2$, preferably between 2 $mm^2$ and 10 $mm^2$, but most preferably is in the region of 5 $mm^2$. The holes are typically spaced apart on the surface of the collimation sheath by between 0.25 cm and 2 cm, preferably between 0.5 cm and 1.5 cm, but most preferably, the hole spacing is around 1 cm. The holes may optionally be spaced apart over the whole surface of the collimation sheath. In typical embodiments of the invention, however, the holes do not extend over the whole surface of said collimation sheath and, in said embodiments, it is generally the lower sections of the sheath which do not include holes. Thus, for example, in the embodiment wherein the collimation sheath is spherical in shape and includes a platform on which a holding device is located, it is generally preferred that the area of the lower section of the external shell which is below the level of the platform is free from holes.

Following exposure of the device to radiation, the shells are removed from the core material by separating the different sections of the sheaths. The sheaths may then be re-used for further radiation detection and mapping procedures, by enclosing new samples of polymeric core materials therein, whereas the core materials, once exposed, are of course not reusable.

In the method according to the second aspect of the invention, the device according to the invention is placed in a location to be investigated. The device may simply be placed manually by an operator, or remotely by means of a manipulator or remote arm. In further embodiments, the invention envisages the use of a purpose built mechanical device for such purposes, for example, when the device is to be deployed in particular physical locations and requires handling in situations such as through a cave wall, or when suspended from a device such as a crane. Following exposure, the device is then retrieved by reversing the chosen deployment method and, once removed from the area under investigation, the polymeric core material may be removed, generally by hand, from the sheath for subsequent analysis.

Placement of the device is a key aspect of the method of the invention, since a knowledge of the location of the device in relation to the surrounding space is crucial for the accurate mapping and image reconstruction of the incident radiation. Furthermore, placement of the device in a known orientation is extremely important in the context of reconstructing directional information and knowing which directions are north, south, east and west. Typically, devices according to the invention may conveniently be positioned in a variety of possible different orientations, either by placing them on a suitable surface, or in a suitable support means or, alternatively, by suspending them from suitable suspending means.

Various simple means may be employed in order to ensure that the exact location is known. Thus, for example, the device may be placed next to or close to an item of plant furniture which has a known position and is documented on a technical drawing of the space in question. This space may then be reconstructed in, for example, AUTOCAD which could thereby provide the basis for the image reconstruction. In an alternative approach, some secondary means, such as laser scanning, may be applied to the positioning of the device. A further possibility could be remote deployment of the device on the end of a manipulator or positioning system as previously discussed, thereby allowing the device to be placed in a recordable position. Moreover, the device may be deployed using a vehicle type robotic deployment system.

Simple means may also be applied to ensuring that the orientation of the device in the system under investigation is precisely defined. Thus, for example, the outside of the collimation sheath may be clearly marked with directional arrows, and the device then placed such that the arrows are directed towards known positions. Alternatively, a marked base plate may be employed, with the device being carefully placed on the base plate relative to the markings, which would thereby provide an aid to accurate orientation. In a further alternative embodiment, laser scanning may be employed in order to accurately position the device and, in such a case, it would be necessary for a reflective marking to be incorporated on the outer surface of the collimation sheath. This embodiment also provides the possibility for imaging of the space—for example, cell, glovebox or room, within which the device is deployed.

After being placed in the chosen location, the device is allowed to remain in situ for a predetermined length of time, the length of the time period being determined with reference to the dose of radiation to which the device is exposed. The polymeric core operates optimally for a specific absorbed dose and, therefore, the device must be allowed to remain in situ for a sufficiently long period for the level of this absorbed dose to be attained. It will be apparent that, as a consequence, the higher the dose rate to which the device is exposed, the less is the time of exposure which is necessary.

Typically, exposure of the device takes place to a level of between 1 mGy and 100 Gy, this value being determined by the radiation levels within the area under investigation. There is, of course, an inverse relationship between exposure dose and time of exposure since, as the radiation dose to which the device is exposed increases, so the length of time required in order to attain a desired level of exposure decreases, and vice versa.

In accordance with a preferred embodiment of the invention, the device may be enclosed in suitable wrapping means, or "bagged" in order to reduce the risk of contamination. Typically, at least one, most suitably two, three or four, plastic bags may be used for this purpose. Thus, the likelihood of the device becoming contaminated by, for example, a sample of radioactive dust is reduced, thereby limiting the chances of radioactive contaminant being exported from the area under investigation. Clearly, this approach offers significant benefits in terms of health and safety. Preferred wrapping means comprise thermoplastic materials, such as polyethylene or poly(vinyl chloride). Following removal of the device from the area under investigation, the wrapping means is removed from the device prior to analysis.

The analysis step of the method according to the invention involves the use an optical flat bed scanner to visualise each of the said polymeric sheets which, when digitally stacked using a suitable software package such as ImageJ, provide a 3D reconstruction of the polymeric core, followed by subsequent further software-based analysis in order to provide an image defining the location and nature of the radiation present by utilising a knowledge of the positional placement of the design and the assigned cell/confined space geometry. Following scanning of the individual sheets, it is then possible to digitally stack the sheets in order to provide a 3-dimensional representation of the polymeric core.

From this 3D reconstruction of the polymeric core, it is then possible to apply a software-based approach so as to provide an image defining the location and nature of the radiation present. In forming the image or map in this way, each hole in the collimation sheath effectively represents one pixel and, consequently, the greater the number of holes in the sheath, the better the resolution. In addition, it is found that positioning of the device is important in this regard in that better resolution also results the closer the device is to a perimeter, such as a wall or ceiling. The product of this stage in the process is, therefore, in the form of a number of images. Thus, if a device according to the invention is placed in a cubic space on the floor, five images will be produced, four of which represent each wall, with the fifth representing the ceiling. In addition to providing data regarding the delivered dose, the method of the invention may also facilitate a further set of images allowing for the construction of maps relating to the types of isotope which are present.

Figure 1:
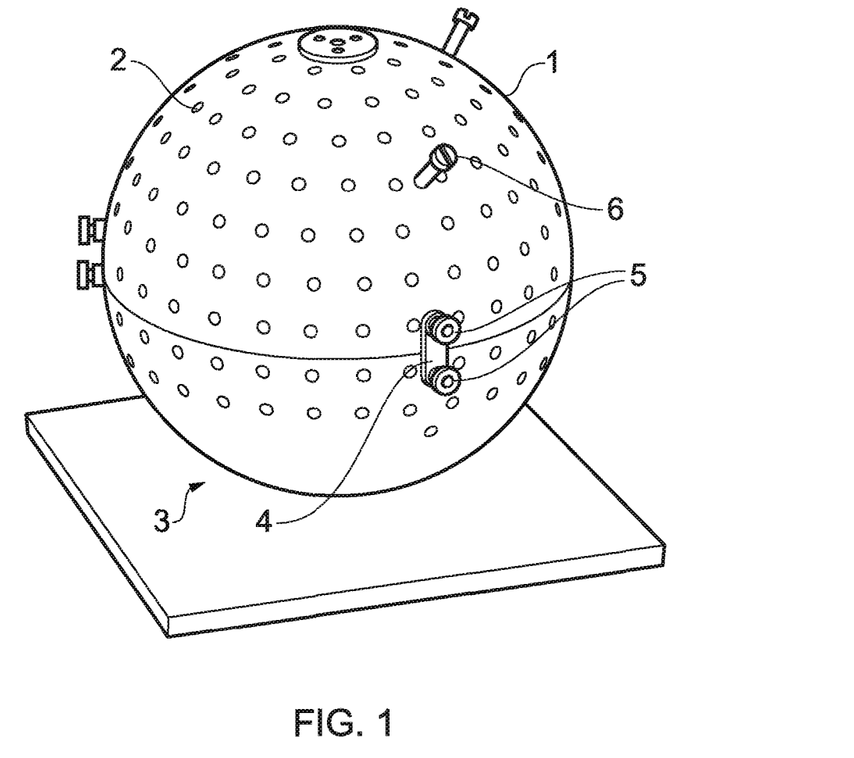
FIG. 1 shows an embodiment of a device according to the invention.

In order to facilitate a better understanding of the invention, it will now be further described with reference to the accompanying figures. Thus, in FIG. 1 there is depicted an embodiment of a spherical device according to the invention wherein there can be seen the external shell comprising collimation sheath (1) having upper (2) and lower (3) sections, which are held together by fastening means comprising brass plate (4) and screws (5). There are also illustrated protruding members (6) which may be used as attachment means for suspending said device.

Figure 2:
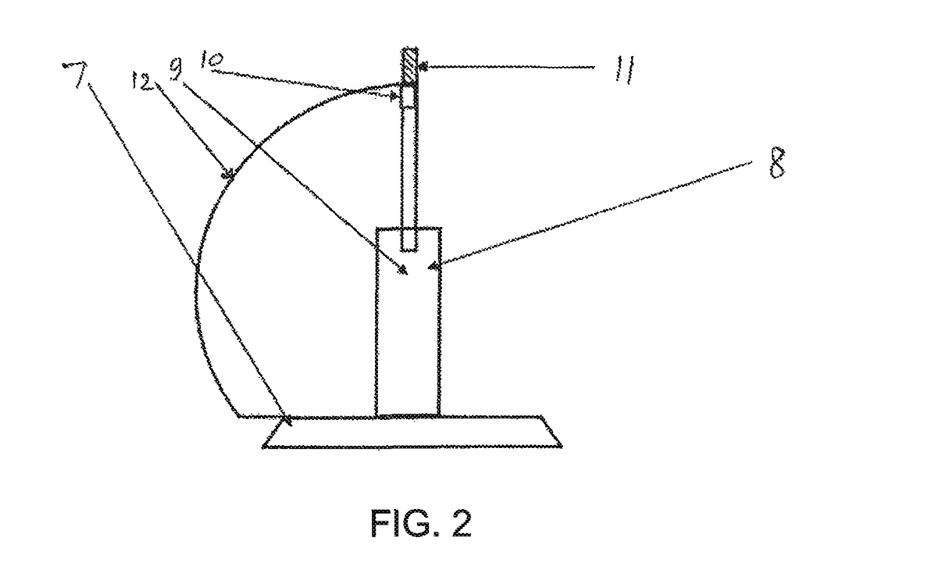
FIG. 2 shows a side elevation of a holding device for use in an embodiment of a device according to the invention.

In FIG. 2 there is illustrated a side-elevation of a holding device for use in an embodiment of a device according to the invention, including a base section (7) on which the components of the core material may be placed, the base section being fixedly attached to a central section (8) including lower shaft (9) and upper spindle (10) with threaded section (11). The holding device additionally comprises and outer section comprising curved arm (12) attached at its lower end to the base section and, at its upper end, to the upper spindle of the central section. The threaded section is adapted to receive a bolt which may optionally be inserted through a suitable orifice in the collimation sheath and may provide additional securing means or, for example, the facility for attachment of suspending means to the top of the sheath.

Figure 3:
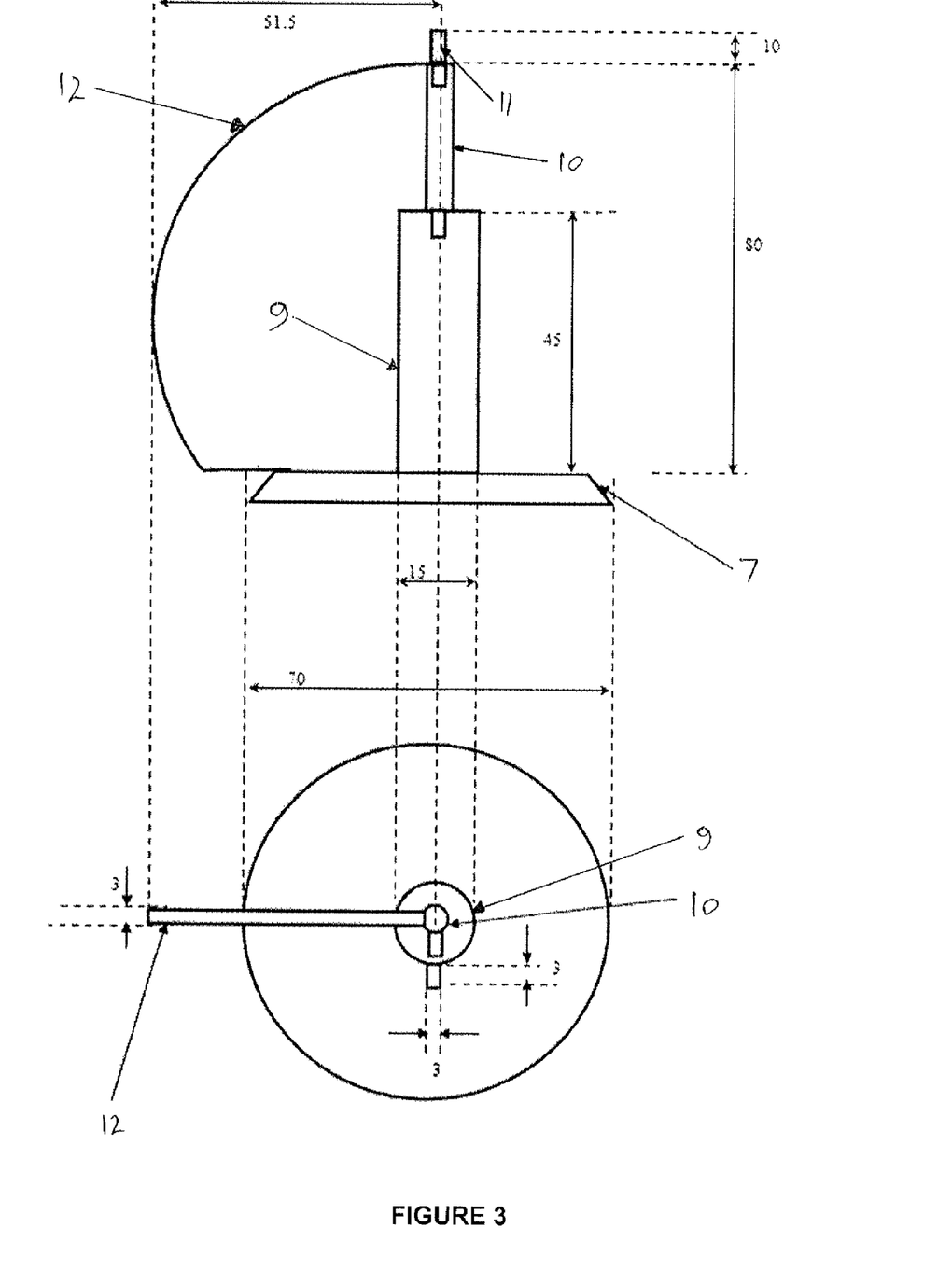
FIG. 3 includes side elevation and plan views of the holding device, including dimensions.

FIG. 3 further illustrates the holding device by providing side elevation and plan views thereof, showing the components as in FIG. 2, but additionally including the dimensions of a typical holding device, in mm.

Figure 4:
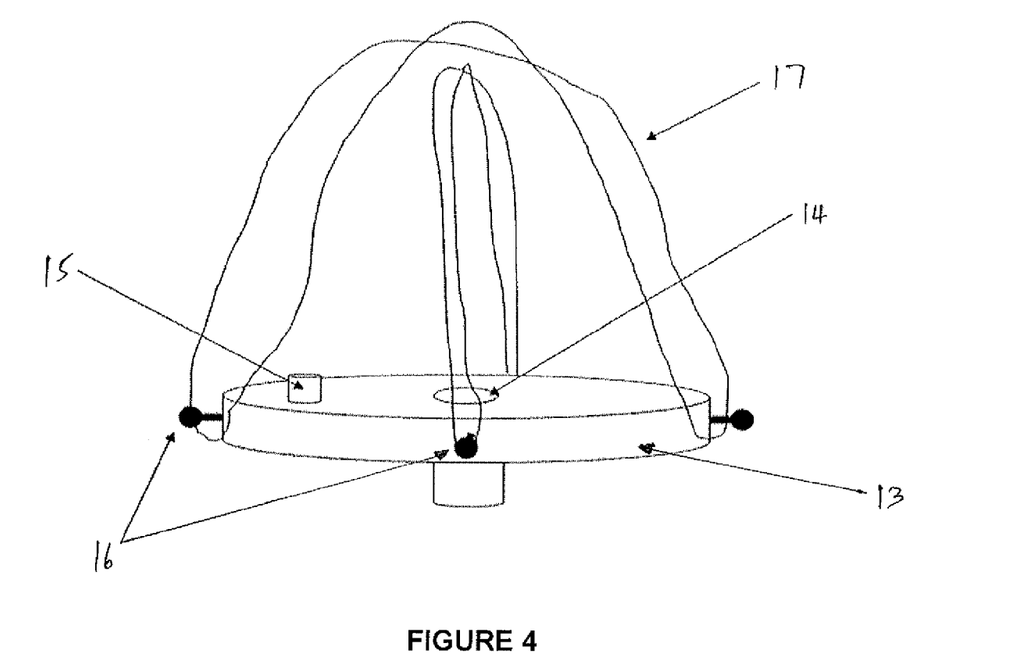
FIG. 4 illustrates the supplementary attachment means used to secure the holding device in place.

FIG. 4 illustrates the supplementary attachment means used to secure the holding device in place. so there are seen the platform (13) on which the holding device is to be located, the platform comprising centrally located affixing means (14) by which the platform may be fixedly attached to the inner surface of the lower section of the external shell, engaging means in the form of protrusion or nub (15) adapted to cooperate with a recess on the underside of the base section of the holding device, and protruding members in the form of screws (16) located on the side of said platform such that flexible attachment means, comprising flexible straps (17), may be attached thereto and may therefrom extend over the holding device and core material located therein.

Figure 5:
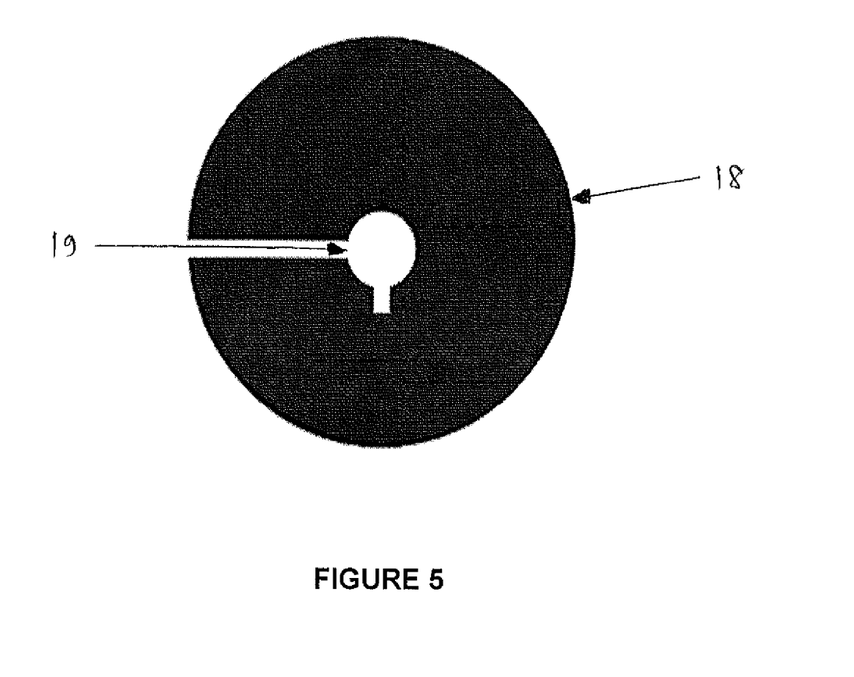
FIG. 5 depicts a polymeric sheet for use in a device according to an embodiment of the invention.

FIG. 5 shows a polymeric sheet (18) for use as a component of the core material in a device according to an embodiment of the invention which comprises a spherical external; shell, the polymeric sheet incorporating incision (19) to allow it to be fitted around the central section of a holding device.

Figure 6:
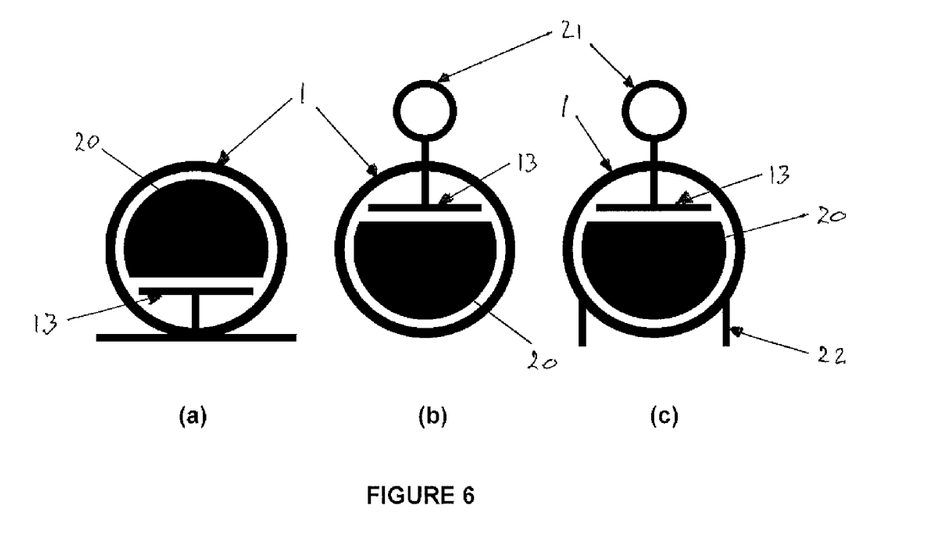
FIG. 6 shows different deployment options for a device according to an embodiment of the device of the invention in a method according to the invention.

In FIGS. 6(a), (b) and (c), there are depicted different deployment options for a device according to an embodiment of the device of the invention in a method according to the invention. Thus, in the standard deployment of FIG. 6(a), the device is placed on a surface with the core material (20) located in the holding device (not shown) seated on the platform (13) within the collimation sheath (1), whilst FIG. 6(b) illustrates a hanging deployment, wherein suspending means (21) may be employed to allow the device to be suspended from an upper surface with the core material (20) located under platform (13), and FIG. 6(c) shows inverted deployment of the device, with the outer surface of the collimation sheath (1) being placed on support means (22).

The device is a non-electrical unit, operating without the necessity for an electrical supply, and it is capable of providing accurate survey data and hazard analysis. The device offers safety benefits, since it reduces dose exposure to operators and eliminates the need for cumbersome, heavy equipment. Furthermore, the output enables safe decommissioning and decontamination strategies to be developed. The device of the invention has a major advantage over the devices of the prior art in that it is able to deal with high radiation backgrounds and to be deployed in confined or restricted spaces. The device is placed in a suitable location where the presence of radiation is to be detected, and allowed to remain in situ for the required exposure time. The device is then recovered and analysed to provide a reconstructed image of the location and type of radiation hazard within the domain of interest.

Previous means for undertaking this task had generally involved the use of hand held dosimeters, or the Radscan® 800 previously discussed. However, the hand held devices may not be used in high radiation backgrounds, due to concerns for the safety of operatives, and are of limited value in confined spaces, since operatives may not be able to access these areas, whilst the Radscan® 800 has disadvantages in terms of cost and the requirement for a nearby supply of electricity, which clearly limits the locations in which it may be used. The device of the present invention suffers none of these disadvantages.

The device and method of the invention principally find application in pre-decontamination operations, by facilitating mapping of the type and location of radiation hazards in nuclear facilities, where there is either reduced access due to confined space or unacceptably high background radiation levels, which may be too high to allow for safe access, or to permit use of electrical components. The technology can thus be used to map the whereabouts and type of radiation on nuclear plants, gloveboxes, in cells, confined spaces, and other radioactive environments confined by shielding, for example between two or more containment walls on a nuclear storage facility or in military facilities following radiation release. Hence, the device and method have potential use in many military and security related applications.

The device and method of the present invention provide radiation detecting means which show markedly improved radiation sensitivity when compared to the devices and methods of the prior art. Typically, prior art devices have a total target dose of around 2 Gy, whereas the present invention allows for increases in sensitivity in the region of 100-fold, with target doses routinely being as low as 1 cGy. Consequently, deployment times when using the apparatus and method of the present invention are significantly lower than those achieved when using prior art technology.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A device for the detection and mapping of radiation emitted by radioactive materials, said device comprising a polymeric core located within an external shell material, wherein said polymeric core comprises a plurality of stacked polymeric sheets comprising at least one radiation sensitive component which is sensitive to said radiation emitted by said radioactive materials and said external shell comprises a collimation sheath, wherein said collimation sheath is optionally removable from the polymeric core material following radiation exposure, and is optionally re-useable in further such devices.

2. The device as claimed in claim 1 wherein said radiation sensitive core component is sensitive to gamma-radiation and optionally sensitive to beta-radiation and neutron radiation.

3. The device as claimed in claim 1 wherein said plurality of stacked polymeric sheets comprises at least one of the following:
   at least one inert intermediate layer;
   from 2 to 500 stacked sheets; and/or
   a plurality of inert intermediate layers spaced therebetween.

4. The device as claimed in claim 3 which comprises alternate polymeric sheets and inert layers comprising one more inert layer than the number of polymeric sheets, such that top and bottom layer comprises an inert layer.

5. The device as claimed in claim 1 wherein said polymeric core comprises a cubic, cylindrical, spherical or truncated spherical core.

6. The device as claimed in claim 1 wherein said external shell is shaped in a complementary way to said core, wherein said device optionally comprises a spherical shape and has a diameter in the region of 5-20 cm, optionally around 13 cm.

7. The device as claimed in claim 1 wherein said stacked polymeric sheets form transparent moulded pieces.

8. The device as claimed in claim 1 wherein said stacked polymeric sheets comprise radiochromic based self developing radiation films, wherein said radiochromic based self developing radiation films optionally comprise polyester layers and layers of radiation sensitive materials comprising crystalline image receptive polyacetylenic compounds.

9. The device as claimed in claim 8 wherein said sheets of radiation sensitive material comprise a layer of radiation sensitive material about 30 µm thick applied to a clear polyester substrate about 175 µm thick wherein a thin topcoat overlays the radiation sensitive layer and the coated layers are overlaminated with a polyester layer about 50 µm thick and a pressure-sensitive adhesive.

10. The device as claimed in claim 3 wherein said inert intermediate layers comprise non-radiation sensitive machinable material, optionally aluminium.

11. The device as claimed in claim 3 wherein the thickness of said inert intermediate layers is in the range of from 1 mm to 3 mm.

12. The device as claimed in claim 1 wherein said stacked polymeric sheets comprise a colour change material.

13. The device as claimed in claim 1 wherein said collimation sheath comprises at least one of the following:
   a shell including a plurality of holes;
   a metal which is machinable and/or castable and is optionally tungsten; and/or
   a sphere which comprises two separate detachable sections comprising fastening means to secure the sections together.

14. The device as claimed in claim 1, further comprising a holding device, adapted to securely immobilise said core material within said shell, wherein said holding device optionally comprises a base section and locating means wherein said locating means comprise a central section and an outer section which together define the space within which the core material is to be located, wherein said holding device is optionally securely located on a platform inside said external shell which is fixedly attached within said shell, and is optionally further secured to said platform by supplementary attachment means, wherein said supplementary attachment means optionally comprise at least one flexible strap.

15. The device as claimed in claim 14 wherein said central section comprises a shaft fixedly attached to said base section and said outer section comprises at least one arcuate outer member attached at one end to said base section and, at the other end, to the end of said central section which is distant from said base section, wherein said at least one arcuate outer member optionally comprises a single curved arm attached at one end to the base section and, at the other end, to a central section comprising a central shaft.

16. The device as claimed in claim 1 wherein said collimation sheath comprises at least one of the following features:
   thickness of the collimation sheath is in the region of from 1 to 20 mm;
   cross-sectional area of the holes in the collimation sheath is in the region of between 0.5 mm$^2$ and 25 mm$^2$;
   holes that do not extend over the whole surface of said collimation sheath;
   holes in the collimation sheath are spaced apart on the surface thereof by between 0.25 cm and 2 cm.

17. A method for the detection and mapping of radiation in a location, wherein said method comprises:
   placing a device according any one of claims 1-16 in the location to be investigated;
   allowing said device to remain in said location and be exposed to said radiation for a predetermined length of time;
   removing said device from said location;
   removing the polymeric core from the external shell;
   analysing said polymeric core by means of an optical analysis technique applying a software-based image reconstruction algorithm to image the polymeric core; and
   determining the location, form and intensity of said radiation by further software-based analysis,
wherein said operations of placing and removing said device in and from said location are optionally carried out by hand or remotely, wherein said exposure optionally takes place to a level of between 1 mGy and 100 Gy, wherein the duration of said exposure is optionally between 1 and 15 hours, and wherein said device is optionally placed in suitable wrapping means prior to being placed in a location to be investigated, wherein said wrapping means optionally comprises a thermoplastic material.

18. The method as claimed in claim 17 wherein said analysis of said polymeric core material is carried out by means of:
   visualising each of the stacked polymeric sheets by means of an optical flat bed scanner;
   digitally stacking using a software package to provide a 3D reconstruction of the polymeric core; and
   subsequent software-based analysis to provide an image defining the location and nature of the radiation present by utilising a knowledge of the positional placement of the design and the assigned cell/confined space geometry.

19. The method as claimed in claim 17 which comprises mapping the location, intensity and identity of radiological hazards in three dimensions in active cells, gloveboxes, other active plants and confined spaces, and/or for use in decommissioning and decontamination operations.

* * * * *